Figure 1:
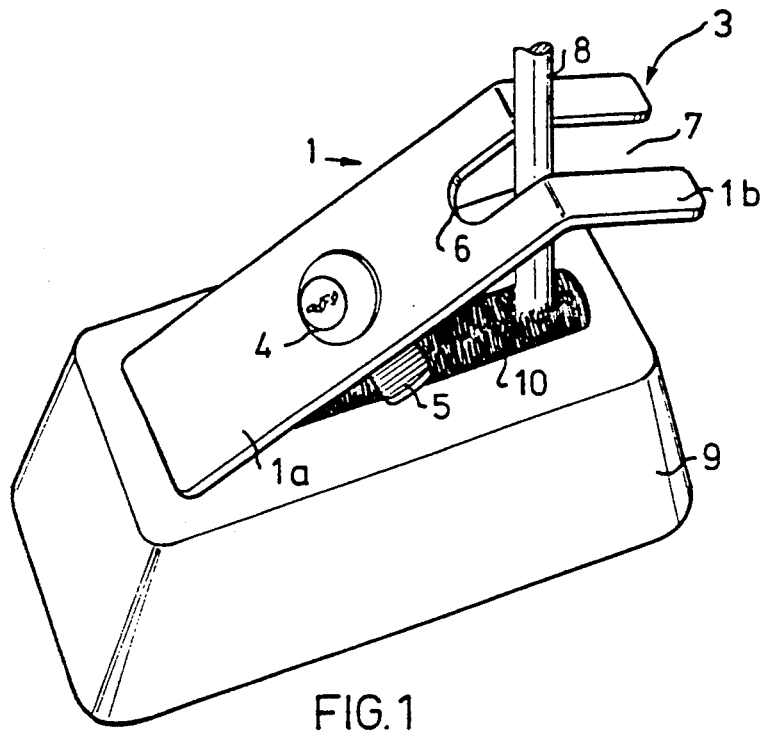

United States Patent [19]

Nordberg

[11] Patent Number: 4,993,248

[45] Date of Patent: Feb. 19, 1991

[54] LOCKABLE ANTI-THEFT DEVICE FOR VEHICLES

[76] Inventor: Agneta Nordberg, Nidarosgatan 5, S-163 34 Spånga, Sweden

[21] Appl. No.: 435,451

[22] PCT Filed: Dec. 18, 1987

[86] PCT No.: PCT/SE87/00614

§ 371 Date: Nov. 17, 1989

§ 102(e) Date: Nov. 17, 1989

[87] PCT Pub. No.: WO88/09275

PCT Pub. Date: Dec. 1, 1988

[30] Foreign Application Priority Data

May 20, 1987 [SE] Sweden ................................ 8702083

[51] Int. Cl.⁵ ............................................. E05B 65/12
[52] U.S. Cl. ........................................ 70/247; 70/202; 70/211
[58] Field of Search ................ 70/247, 248, 201, 202, 70/168, 169, 209, 210, 211

[56] References Cited

U.S. PATENT DOCUMENTS

| | | | |
|---|---|---|---|
| 1,247,512 | 11/1917 | Dobler | 70/202 |
| 2,693,100 | 11/1954 | Wiegel | 70/168 |

FOREIGN PATENT DOCUMENTS

| | | | |
|---|---|---|---|
| 6421 | 12/1927 | Austria | 70/202 |
| 220672 | 10/1986 | European Pat. Off. | |
| 422416 | 12/1925 | Fed. Rep. of Germany | |
| 2736552 | 2/1979 | Fed. Rep. of Germany | |
| 794918 | 12/1935 | France | |
| 843268 | 9/1938 | France | |
| 859309 | 6/1940 | France | |
| 1074288 | 3/1954 | France | 70/202 |
| 1388314 | 12/1964 | France | 70/247 |
| 2590857 | 6/1987 | France | 70/247 |
| 87/06897 | 11/1987 | PCT Int'l Appl. | |
| 2152454 | 8/1985 | United Kingdom | |

*Primary Examiner*—Robert L. Wolfe
*Attorney, Agent, or Firm*—Ostrolenk, Faber, Gerb & Soffen

[57] ABSTRACT

The anti-theft device comprises a strong steel plate (1) having a flat, substantially horizontal section (1a) combined in one piece with fork-shaped, bent section (1b). At the rear end of the plate (1) is an attachment boss (2) which in locking position cooperates with the rear region of a gearbox (9). A lock (4) is welded to the plate (1) between the boss (2) and the slit (7) of the fork arrangement (3), said lock being a double locking cylinder (5) which is applied in the channell (10) of the gearbox (9) and is turned to a position below the upper limiting wall of the gearbox (9) when the key is turned. In locking position the end edge (6) of the slit (7) in the fork arrangement (3) is in the immediate vicinity of the gear lever (8) and locks this in parking position. The anti-theft device is simple to install and can easily be removed from the vehicle.

3 Claims, 1 Drawing Sheet

LOCKABLE ANTI-THEFT DEVICE FOR VEHICLES

The invention relates to a lockable anti-theft device for a vehicle provided with a manual control lever (gear lever or gear selection lever) to achieve various drive positions, said device comprising blocking means to restrict the range of movement of the control lever in a lock position.

A wide variety of locking or anti-theft devices exist to prevent vehicles from being stolen. The most usual device, with which almost all vehicles are now equipped, is the key-operated ignition lock. Unfortunately such anti-theft devices have proved insufficient since the ignition contact can easily be by-passed and the leads between battery and starter connected directly to each other.

To further impede thefts, therefore, other types of locking devices have been added, e.g. of electrical or mechanical type, such as steering-wheel locks. However, these measures have unfortunately not given the desired result either and this type of crime still constitutes a major problem for owners, insurance companies and police authorities.

Anti-theft devices also already exist to lock the gear lever of a manual gearbox or in a vehicle with automatic transmission in a specific locking position such as reverse, neutral or parking position.

An example of such a device is described in DE-A-1 928 255. The anti-theft device described here is designed to permit driving in a low gear or in reverse, in a garage for instance. The lock comprises at least two movable parts which at least in locking position form a slit in which movement of the gear lever is restricted, at least to a low gear position. This anti-theft device is relatively complicated and requires fairly extensive installation work in the vehicle. The total cost is therefore relatively high, especially if it is to be fitted in a vehicle already built.

A similar locking system is described in GB No. 2 152 454. The control lever is, however, locked in one position here. This known lock consists of a lock casing which must be permanently fitted in the vehicle. The casing is provided with a displaceable locking plate provided with an aperture. When locked, the locking plate is displaced so that the aperture surrounds the gear lever and the locking plate is then locked in the casing by means of a key. This arrangement has substantially the same drawbacks as that described above. Both devices are clumsy and take up rather much space, thus encroaching on the mobility and convenient use of the gear lever.

Finally, DE-A-2 736 552 describes an anti-theft lock for a vehicle with automatic transmission, in which the gear lever can be locked in relation to the gearbox. Both gear lever and gearbox are specially designed and must therefore be removed and replaced by the construction described if they are to be used in a vehicle already built. This entails unreasonably high costs and very few owners would therefore consider equipping their vehicles with such a device.

The object of the invention is to achieve an anti-theft device for motor vehicles which is simple in design and thus inexpensive, and which can easily be used in a vehicle already built, without requiring extensive installation work.

This is achieved according to the invention in that the anti-theft device comprises a locking member connected to the blocking means, said member being movable to locking engagement with an element in the vehicle and releasable from said element in unlocked position.

Figure 2:
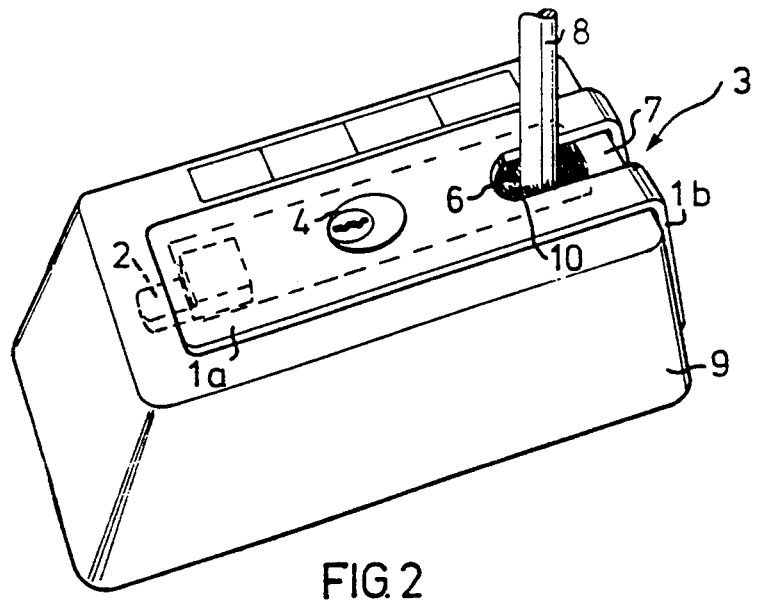

One embodiment of the invention is described by way of example in the following in connection with a vehicle having automatic transmission, with reference to the accompanying drawings in which FIG. 1 shows an anti-theft device according to the invention in perspective, and FIG. 2 shows the anti-theft device according to FIG. 1, in perspective, assembled in locking position in a gearbox.

The anti-theft device shown in the drawings is designed for use in a vehicle with automatic transmission and consists of a strong steel plate 1 shaped to fit the contour of the gearbox 9. It comprises a longish, flat section 1a which in locking position covers most of the channel 10 in which the gear lever 8 runs. One end of the plate 1 is bent 1b, this section following the transition between the substantially horizontal section of the gearbox 9 and its substantially inclined portion, and in the form of a fork arrangement with two side edges covering the assembly screws of the gearbox 9 when in locked position.

The open slit 7 between the edges of the fork arrangement in the bent section 1b continues a short distance into the flat, horizontal section 1a of the plate 1. The slit 7 is wider than the diameter of the gear lever 8 and, when in locked position, its end edge 6 restricts movement of the gear lever 8. The lever cannot be moved to drive position.

A protruding boss 2 is welded to the opposite end of the plate 1, the boss being narrower than the width of the channel 10 in the gearbox 9. A lock 4, lockable with a key, is welded into the flat section of the plate and its double locking bolts 5 are turned, together with the locking cylinder, when the key is turned. The width of the bolts 5 and locking cylinder is less than the width of the channel 10, allowing insertion of the bolts 5 and boss 2 into the channel 10 of the gearbox 9.

The total length of the locking bolts 5 is, on the other hand, greater than the width of the channel 10. Thus, when the device is arranged with the bolts 5 protruding into the channel 10 and the key is turned, the end portions of the bolts 5 will be turned to a position below the upper defining wall of the gearbox 9 and will be locked there.

The anti-theft device is applied with the gear lever in parking position, the boss 2 being inserted below the defining wall of the gearbox 9 at one end of the channel 10. It is then lowered so that the gear lever 8 enters the fork slit 7 and the locking bolts 5 are below the level of the upper defining wall of the gearbox 9. The key is then turned and removed. The plate 1 is now locked in the gearbox 9 due to the engagement of the locking bolts 5. At the same time the end edge of the slit 7 is close to the lever 8, preventing it from being moved to driving position. The procedure for unlocking is obviously the reverse.

In the embodiment shown the strong steel plate 1 is bent following the contour of the gearbox 9, the side edges of the fork 3 thus completely covering the assembly screws on the inclined side of the gearbox. The gearbox 9 cannot then be removed from the cardan shaft by unscrewing the assembly screws. Since the fork section 3 is made in one piece with the rest of the plate 1 and has the same thickness, the side edges of the fork 3 cannot be bent up and the assembly screws are therefore well protected in locking position. In this embodiment the boss 2 has an essential function since it prevents the plate 1 from being shifted backwards, while also positioning the plate. The bent section 1b cooperates with the inclined side of the gearbox and further complicates such an operation.

The combined effect of the plate 1, boss 2, fork 3 and its inclination, as well as the locking bolts 5 is thus that the anti-theft device cannot be moved in locked position, and the gear lever 8 is forced to remain in parking position by the end edge 6 of the slit 7. The vehicle is thus undrivable. Neither can a vehicle thus protected be towed away in the normal manner since the gearbox would then be destroyed. It could only be towed by a break-down truck, with the drive shafts lifted from the ground.

Although the boss 2 has an important function in the embodiment shown, other means for preventing displacement of the plate 1 are also feasible. Similarly the bent fork section is extremely useful, particularly in gearboxes having assembly screws at the front. However, the plate 1 could be entirely flat, or provided with some other member cooperating with the gearbox.

The anti-theft device is admittedly intended for vehicles with automatic transmission and is designed to be locked in the channel 10 of the gearbox 8, but other variants are perfectly possible. The device might, for instance, be designed to lock the gear lever in a vehicle with manual gear transmission and/or be designed to be detachably locked to a different component or element in the vehicle.

Thus, the locking member could comprise a plate with a projection arranged to grip behind an edge of the channel for the lever in the gearing box, the locking member further comprising a pivotable hook or latch which together with the blocking means firmly grips the lever in locking position.

The latch could then be formed by a lock bar and be arranged pivotable in the space between the plate and the top side of the gearbox house. By a suitable design of the cooperating surfaces of the blocking means and the hook, the plate could be prevented from being moved away from the gearing house, for example thereby that the hook and the blocking means frictionally grip the lever to prevent the plate from being pivoted upwardly around the projection.

The blocking means could of course be formed as a fork, as described above, but considering the embodiment with the lock bolt designed as a pivotable hook, it is quite clear that one of the fork fingers could be dispensed with, as the hook functionally would replace that fork finger.

I claim:

1. An anti-theft device for a motor vehicle having a transmission control lever movably mounted in a housing having a top surface, a front surface, an opposing rear surface and opposing side surfaces, the top surface having an elongated slit extending in one direction towards the front face and in the other direction towards the rear face and the lever extending from the top surface, which device comprises:
   a plate shaped to fit the contour of the top surface of the housing;
   a fork at one end of the plate, the tines of which define an open-ended slot for receiving the control lever;
   a boss depending from the other end of the plate and extending therefrom, the boss having a width narrower than the width of the elongated slit in the top surface of the housing so that the boss may be inserted into the slit to position the plate on the top surface with the control lever being received within the slot of the fork and so that the boss may be inserted under the top surface with a portion of the boss engageable with the rear of the top surface slit to prevent any substantial upward or rearward movement of the plate after it is positioned on the top surface of the housing;
   the plate being dimensioned such that when it is placed over the top surface of the housing with the boss underlying the top surface and engaging the rear of the top surface slit, the control lever is received within the fork slot with the closed end of the slot preventing any substantial rearward movement of the control lever within the top surface slit; and
   a lock mounted on the plate and having depending locking bolts which are movable between an unlocked position in which the bolts do not extend beyond the width of the top surface slit to a locking position in which the bolts extend beyond the width of the slit and underlie the top surface to thereby lock the plate to the housing.

2. An anti-theft device as claimed in claim 1, wherein the front ends of the fork are bent downwardly to overlie the front surface of the housing.

3. An anti-theft device as claimed in claim 2, wherein the housing is mounted to the floor of the vehicle by means of assembly screws in the front surface of the housing, and wherein the front ends of the fork overlie the assembly screws and prevent access thereto.

* * * * *